United States Patent [19]

Schmale et al.

[11] Patent Number: 5,397,166
[45] Date of Patent: Mar. 14, 1995

[54] LIGHT-WEIGHT SEAT FOR MOTOR VEHICLES

[75] Inventors: Gerhard Schmale, Hückeswagen; Adolf Kothe, Wermelskirchen, both of Germany

[73] Assignee: Naue/Johnson Controls Engineering GmbH & Co., Germany

[21] Appl. No.: 24,993

[22] Filed: Mar. 2, 1993

[30] Foreign Application Priority Data

Mar. 3, 1992 [DE] Germany ............... 42 06 651.4

[51] Int. Cl.⁶ ............................................. B60N 2/02
[52] U.S. Cl. ............................ 297/344.1; 297/452.23
[58] Field of Search ........... 297/344.1, 452.23, 452.52, 297/452.53, 452.54, 452.63; 248/429

[56] References Cited

U.S. PATENT DOCUMENTS

| | | | |
|---|---|---|---|
| 4,395,011 | 7/1983 | Torta | 248/429 X |
| 4,597,552 | 7/1986 | Nishino | 297/344.1 X |
| 4,606,532 | 8/1986 | Kazaoka et al. | 297/452.52 X |
| 4,687,251 | 8/1987 | Kazaoka et al. | 297/344.1 X |
| 4,775,126 | 10/1988 | Yokoyama | 297/344.1 X |
| 5,067,772 | 11/1991 | Koa | 297/452.54 X |

FOREIGN PATENT DOCUMENTS

| | | | |
|---|---|---|---|
| 0654734 | 3/1986 | China | 297/452.52 |
| 1223706 | 8/1966 | Germany | 297/452.52 |
| 3418233 | 12/1984 | Germany | 297/344.1 |

Primary Examiner—Kenneth J. Dorner
Assistant Examiner—Milton Nelson, Jr.
Attorney, Agent, or Firm—Leonard J. Kalinowski; E. L. Levine; Joseph E. Root, III

[57] ABSTRACT

Many seats are of complicated construction and are therefore heavy and expensive. To obviate these disadvantages, a self-springable seat member on which a cushion is placed, is mounted in its front region on a bridge which is mounted on the outside on the upper parts of the running or sliding rails. Connections for a backrest are secured to the rear regions of the upper parts.

12 Claims, 2 Drawing Sheets

LIGHT-WEIGHT SEAT FOR MOTOR VEHICLES

BACKGROUND OF THE INVENTION

1. Field of the Invention

This invention relates to vehicle seat assemblies, and more particularly, to a seat cushion support arrangement for vehicle seat assemblies.

2. Description of the Prior Art

There have been proposals to form the seat part of a vehicle seat of a springable seat shell which is connected in its front region to an underframe and on which a cushion pad is placed.

A disadvantage of this is the need for the frame surrounding the seat on all sides, to which an upper part of the running or sliding rail required for longitudinal adjustment of the seat is secured, this rail being relatively long, corresponding to the length of the frame. This leads to high costs for the parts needed, which are mounted parallel to one another, so that the weight and also the purchase price are unavoidably high, which is a particular disadvantage for vehicle manufacture.

The invention has as its object to provide a light-weight seat for motor vehicles that does not need such massive and heavy main parts to achieve a high level of seating comfort.

Particular advantages obtained with the invention are that the upper parts of the side running or sliding rails are also used for the longitudinal side connections for the seat, so that there is no need for the conventional frame and a less costly and lighter-weight construction is obtained without the stability and seating comfort being impaired.

In accordance with the invention a mounting means for effective lateral support of the cushion is provided. Further in accordance with the invention, an underneath connection of the cushion at the front and sides of the seat is provided by a retaining hoop.

An exemplary embodiment of the invention is illustrated diagrammatically in the drawings and will now be described in more detail.

DESCRIPTION OF THE PREFERRED EMBODIMENTS

Figure 1:
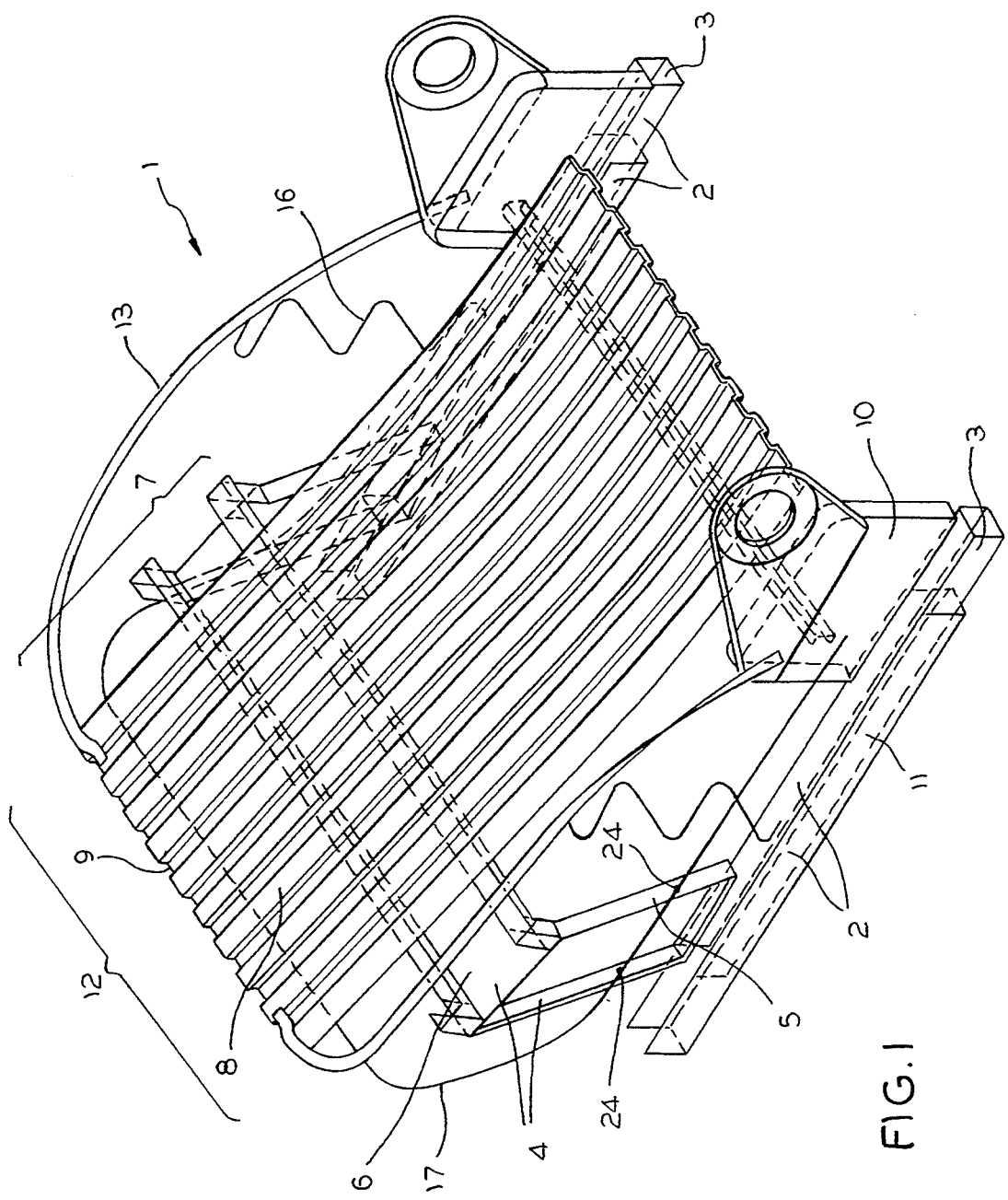
FIG. 1 is a perspective view of a light-weight seat for motor vehicles provided by the present invention, the seat being illustrated with the seat cushion not shown in the drawing.
Figure 2:
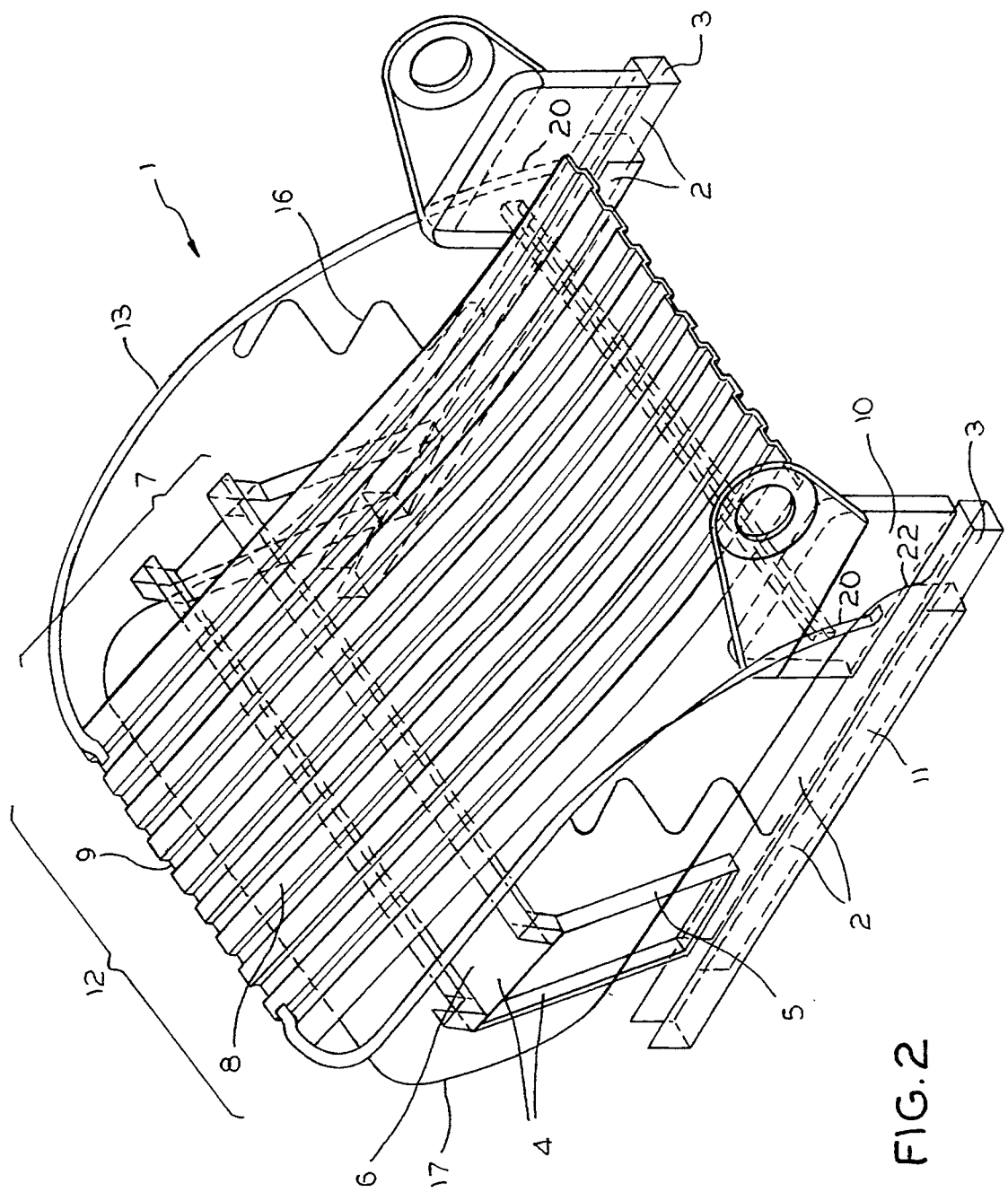
FIG. 2 is a perspective view of a further embodiment for a light-weight seat for motor vehicles provided by the present invention, the seat being illustrated with the seat cushion not shown in the drawing.

Referring to FIGS. 1 and 2, in a light-weight seat 1, of which the cushion is not shown in the drawing, running or sliding rails 2 are arranged on both sides with their lower parts 11 on the floor of the vehicle and a bridge 4 is securely connected in front to the two upper parts 3 through its outer supports 5. A self-springable seat member 8 is fixed by its non-springable front part 7 to a cross beam 6 of the bridge 4 and has impressed stiffening corrugations 9 distributed across its width that become weaker and/or run out towards the rear so as to give a suitable spring constant over the length of the seat. The cross beam 6 and the outer supports 5 can be pressed steel sheet parts and have a top-hat or U-shaped cross-section.

Connections or a backrest mounting 10 for the backrest are arranged on the rear regions of the upper parts 3.

For lateral outer connection or support of the cushion, external cushion support hoops 13 are provided that are connected at the front to the sides of the seat member 8 and also at the back - as shown - to the backrest connection 10, and or else as shown in FIG. their second attachment can be made to the upper part 3 of the running or sliding rails 2 as shown by dashed lines 20. Alternatively, the hoops 13 can be secured laterally outside to the bridge 4.

The cushion support hoops 13 can be formed as spring steel strip parts or profiled section spring rails, and project above the level of the seat member 8 as well as lying beyond it laterally. Between the cushion support hoops 13 and the upper parts 3, and distributed over their length, one or more coiled spring supports 16 can be connected for reinforcement.

For the underneath connection of the cushion on both sides and in front a retaining hoop - as shown - can if necessary be provided in the form of a springable wire retaining hoop 17 that extends rearwardly on both outer sides of the seat member at an appropriate depth and; is secured at the rear to the backrest connection 10 (FIG. 1) or to the upper part 3 as indicated by 22 and in addition is secured at the sides and/or in front, as appropriate, via connector parts 24 to the outer supports 5 and-/or the seat member 8. For this purpose all or part of the seat member 8 can also be correspondingly bent down in front in the transverse region 12 or the seat member can be fitted at the front, in the transverse region 12, with downwardly extending tabs to which the wire retaining hoop is connected.

Depending on the form of the cushion its underneath connection can also be made through a corresponding stiffening means.

We claim:

1. A light-weight seat for motor vehicles comprising: a seat member of a configuration adapted to be springable under load conditions created by an occupant of the seat, said seat member being adapted to receive a cushion, said seat member having a front, a back and first and second side edges, first and second slide rail assemblies located at said first and second side edges, respectively, of said seat member and extending from the front to the back thereof, said slide rail assemblies having a forward portion and a rearward portion; a bridge at said front of said seat member, said bridge including a transversely extending cross beam and first and second lateral supports mounted on said first and second slide rail assemblies, respectively, supporting said front of said seat member on said slide rail assemblies, first and second lateral cushion supporting hoops located adjacent to said first and second side edges, respectively, of said seat member and having lateral portions extending from the front to the back of said seat member, projecting above the level of the seat member and located laterally beyond said seat member, and backrest mounting means secured to said slide rail assemblies at their rearward portions and supporting said back of said seat member.

2. The light-weight seat for motor vehicles according to claim 1, and including a wire cushion retaining hoop for the retention of said cushion, said cushion retaining hoop having a front portion connected to said seat member, lateral portions which extend rearwardly along said edges of said seat member, and a rear portion connected to said backrest mounting means.

3. The light-weight seat for motor vehicles according to claim 1, and including a wire cushion retaining hoop for the retention of said cushion, said retaining hoop having lateral portions extending rearwardly along said edges of said seat member and connected to said lateral supports of said bridge, and a rear portion connected to said slide rail assemblies.

4. The light-weight seat for motor vehicles according to claim 1, including a wire cushion retaining hoop for the retention of said cushion, said cushion retaining hoop having a front portion, lateral portions extending rearwardly along said edges of said seat member, and connected to said lateral supports of said bridge, and rear portion connected to said backrest mounting means.

5. The light-weight seat for motor vehicles according to claim 1, including a wire cushion retaining hoop for the retention of said cushion, said retaining hoop having a front portion connected to said seat member, lateral portions extending rearwardly along said edges of said seat member, and a rear portion connected to said slide rail assemblies.

6. The light-weight seat according to claim 1, wherein said first and second lateral cushion supporting hoops have a front end secured to said seat member and a back end secured to said backrest mounting means.

7. The light-weight seat according to claim 6, wherein said first and second lateral cushion supporting hoops include longitudinal regions, and including spring support means connecting said longitudinal regions to said rail assemblies.

8. The light-weight seat for motor vehicles according to claim 1, wherein said seat member includes stiffening corrugations which are distributed across the width of said seat member.

9. The light-weight seat for motor vehicles according to claim 8, wherein said corrugations run out towards the rear of said seat member so as to provide a spring constant over the length of said seat member.

10. A light-weight seat for motor vehicles comprising: a seat member of a configuration adapted to be springable under load conditions created by an occupant of the seat, said seat member being adapted to receive a cushion, said seat member having a front, a back and first and second edges, said seat member including stiffening corrugations which are distributed across its width, said corrugations running out towards the back of said seat member so as to provide a spring constant over the length of said seat member, first and second slide rail assemblies located at said first and second edges, respectively, of said seat member and extending from the front to the back thereof, said slide rail assemblies having a forward portion and a rearward portion, a bridge at said front of said seat member, said bridge including a transversely extending cross beam and first and second lateral supports mounted on Said first and second slide rail assemblies respectively, supporting said front end of said seat member on said slide rail assemblies, and backrest mounting means secured to said slide rail assemblies at their rearward portions and supporting said back of said seat member.

11. The light-weight seat according to claim 1, wherein said first and second lateral cushion supporting hoops have a front end secured to said seat member and a back end secured to said slide rail assemblies.

12. A light-weight seat for motor vehicles comprising: a seat member adapted to receive a cushion, said seat member having a front, a back and first and second side edges, first and second slide rail assemblies located at said first and second side edges, respectively, of said seat member and extending from the front to the back thereof, said slide rail assemblies having a forward portion and a rearward portion; support means bridging said slide rail assemblies at said front of said seat member and supporting said front of said seat member on said slide rail assemblies, back rest mounting means secured to said slide rail assemblies at their rearward portions and supporting said back of said seat member on said slide rail assemblies, and first and second lateral cushion supporting hoops having lateral portions extending along said edges of said seat member from the front to the back of said seat member, projecting above the level of said seat member and located laterally beyond said seat member, each of said cushion supporting hoops having a front end connected to said front of said seat member and a back end connected to said backrest connection means.

* * * * *